UNITED STATES PATENT OFFICE.

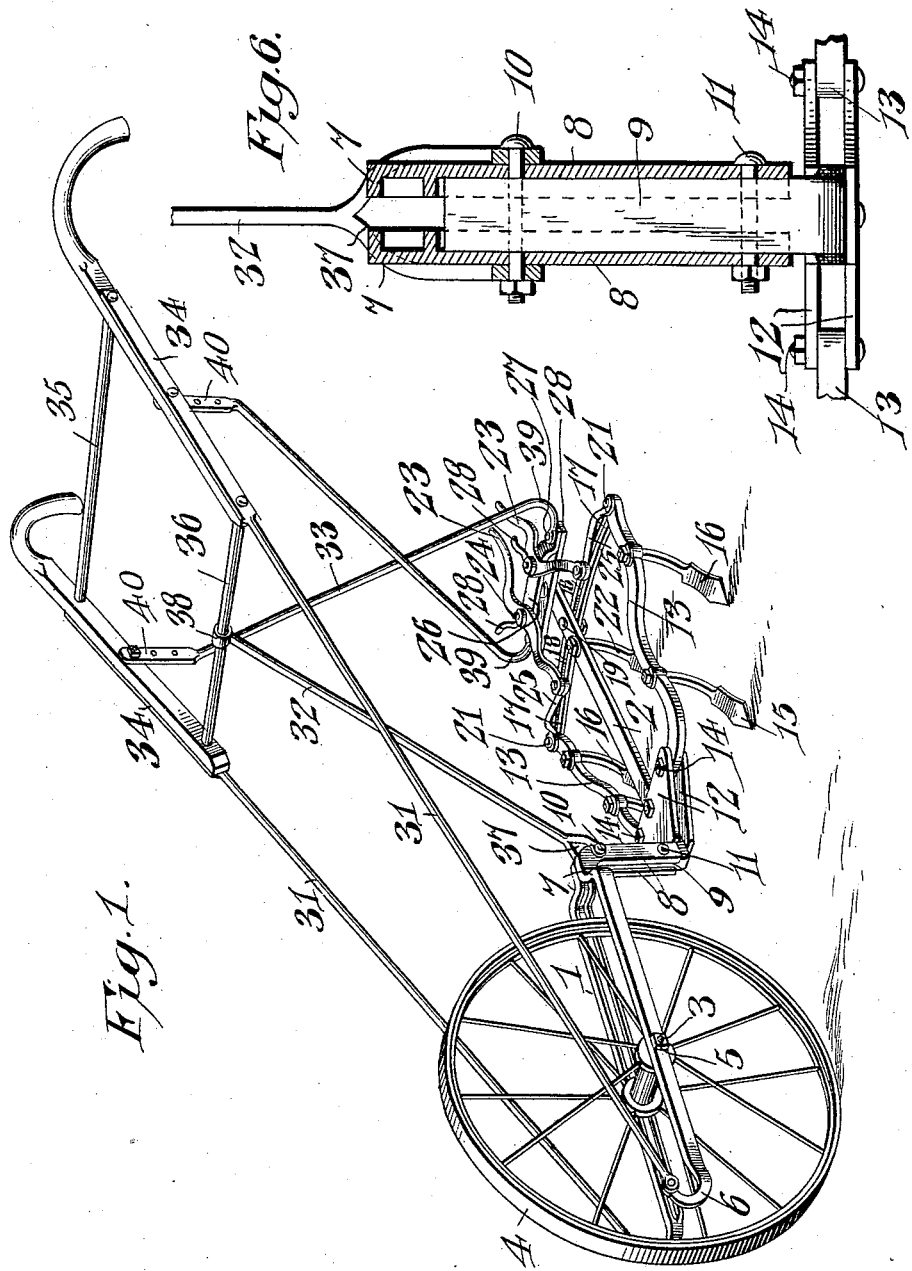

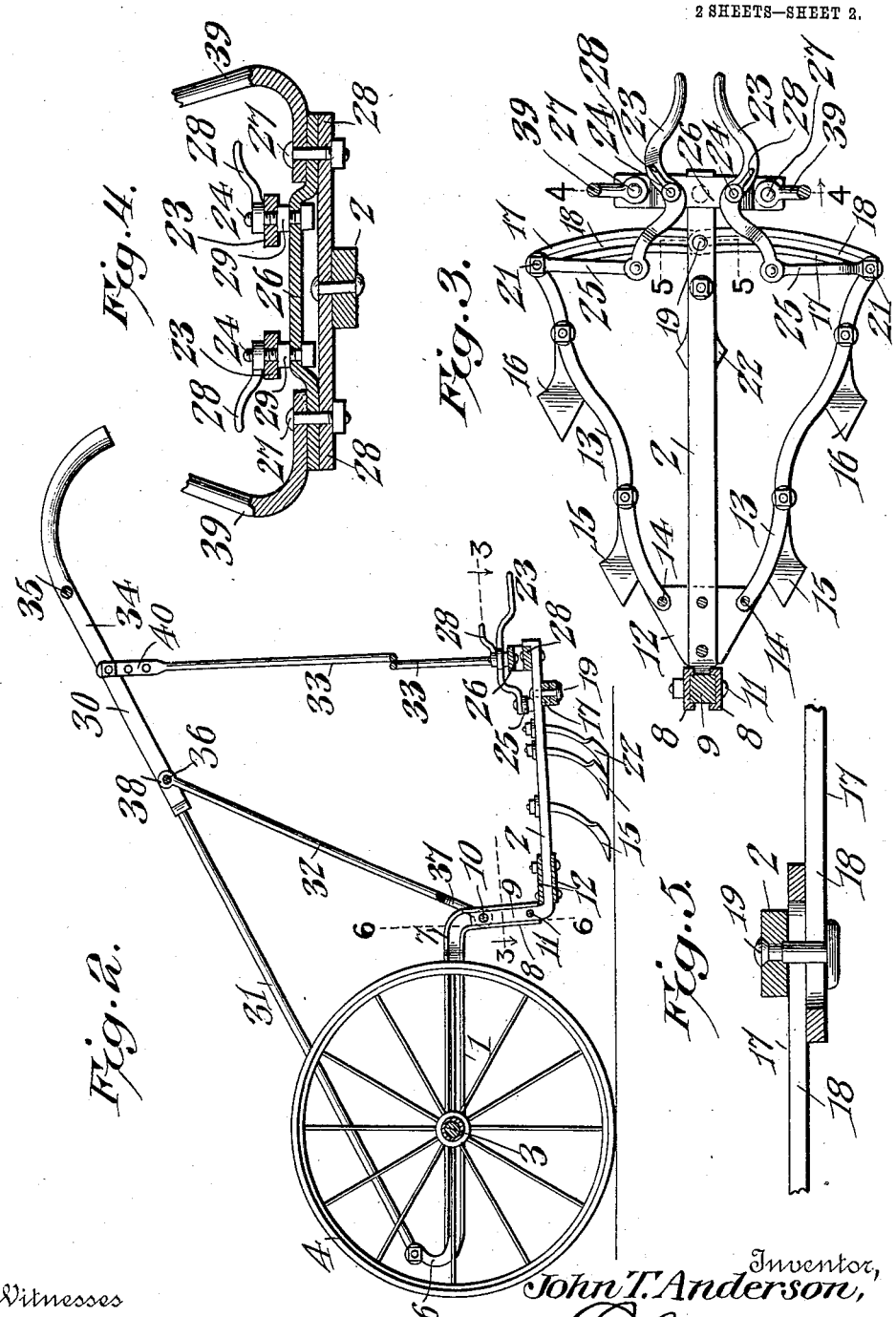

JOHN T. ANDERSON, OF URBANA, OHIO.

GARDEN-CULTIVATOR.

No. 914,911.  Specification of Letters Patent.  Patented March 9, 1909.

Application filed August 28, 1908. Serial No. 450,737.

*To all whom it may concern:*

Be it known that I, JOHN T. ANDERSON, a citizen of the United States, residing at Urbana, in the county of Champaign and State of Ohio, have invented a new and useful Garden-Cultivator, of which the following is a specification.

The invention relates to improvements in hand cultivators.

The object of the present invention is to improve the construction of hand cultivators, and to provide a simple and comparatively inexpensive one of great strength and durability, adapted to be easily handled and capable of affording the operator great power in pushing it.

A further object of the invention is to provide a hand cultivator of this character, equipped with blades or shovels, capable of lateral adjustment to arrange them the desired distance apart, and adapted to be quickly changed from one adjustment to another.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings:—Figure 1 is a perspective view of a hand cultivator, constructed in accordance with this invention. Fig. 2 is a central longitudinal sectional view. Fig. 3 is a horizontal sectional view, taken on the line 3—3 of Fig. 2. Fig. 4 is a transverse sectional view on the line 4—4 of Fig. 3. Fig. 5 is a detail sectional view on the line 5—5 of Fig. 3. Fig. 6 is a transverse sectional view on the line 6—6 of Fig. 2.

Like numerals of reference designate corresponding parts in all the figures of the drawings.

The hand cultivator comprises in its construction a frame composed of a pair of spaced front bars or members 1 and a centrally arranged rear bar or member 2. The spaced front bars or members 1 are pierced at an intermediate point by a shaft or axle 3 on which is mounted a wheel 4, arranged in the space between the front bars or members 1, as clearly illustrated in Fig. 1 of the drawings. The shaft or axle is provided with threaded ends for the reception of nuts 5, which engage the outer faces of the side bars or members 1. The spaced sides bars 1, which are preferably constructed of channeled metal, have upwardly extending front terminals 6, and their rear terminals are bent laterally at 7 to arrange them close together and are extended downward to provide depending arms 8. The rear central bar or member 2 is provided at its front end with an upwardly extending arm 9, located between the depending arms 8 of the front bars and secured in the grooves thereof by transverse bolts 10 and 11. The upwardly extending arm of the rear bar of the frame and the depending arms of the front bars form an intermediate upright portion, which connects the front and rear portions of the frame.

Secured to the front portion of the centrally arranged rear bar or member 2 is a pair of triangular forwardly tapered plates 12, arranged on the upper and lower faces of the bar or member 2 and extending laterally therefrom and spaced apart to receive the front terminals of a pair of laterally adjustable pivoted side bars 13, secured to the plates 12 by vertical bolts 14. The laterally adjustable pivoted bars or members 13, which are equipped with front and rear cultivator blades or shovels 15 and 16, are provided at their rear ends with arcuate arms 17, extending inwardly and having their inner ends crossed at the lower face of the rear portion of the central bar or member 2 of the frame. The arms 17 are provided with slots 18 for the reception of a vertical rivet or pin, or other suitable fastening device, depending from the bar or member 2 and extending through the slots 18. The vertical fastening device 19 pierces the bar or member 2 and is rigidly secured to the same, and it is provided at its upper and lower ends with heads, the lower head being enlarged, as clearly shown in Fig. 5, and forming a support for the slotted arms or braces 17 of the pivoted bars or members 13. The arms or braces 17 are secured to the rear ends of the bars or members 13 by means of vertical bolts 21, but they may be connected to the pivoted bars or members in any other preferred manner. By this construction the rear portions of the pivoted bars or members 13 are connected with the frame and are braced in their different adjustments.

The central bar or member 2 of the frame is equipped at its rear portion with a cultivating blade or shovel 22, arranged between the rear blades or shovels 16, as clearly shown in Fig. 3 of the drawings. The front blades or shovels 15 will in practice be preferably five inches in length and the rear blades or shovels will be six inches, but cultivating blades or shovels of any other desired size may be employed, as will be readily understood. By constructing the rear blades or shovels longer than the front blades or shovels, the hand cultivator is rendered easier to use, and at the same time it stirs the ground equally as well as those equipped with shovels of the same length.

The pivoted side bars or members, which are preferably sinuously curved, are adjusted by means of a pair of longitudinal levers 23, pivoted at an intermediate point by vertical bolts 24 and having front and rear arms, the front arms being connected with the rear ends of the pivoted bars or members 13 by outwardly extending transverse links 25, pivoted at their inner ends to the front terminals of the adjusting levers and connected at their outer ends to the bars or members 13 by the bolts 21. The adjusting levers are supported by a transversely disposed arched bar 26, secured at its terminals by bolts 27 to a transversely disposed bar 28 and pierced at intermediate points by the bolts 24, which form fulcrums for the adjusting levers. The levers and the side bars are secured in their adjustment by means of tail nuts 28, arranged on the upper ends of the bolts 24 and engaging the levers 23. The bolts 24 are provided at the upper face of the arched bar with nuts 29, and they have their heads fitted against the lower face of the arched bar. The tail nuts are readily loosened, and when the adjusting levers are thereby released, they may be readily oscillated to spread the side cultivating blades or shovels, or to move the same inwardly toward the center of the frame. After the cultivating blades or shovels have been properly positioned, they may be quickly secured in their adjustment by tightening the tail nuts. The adjusting levers 23 are preferably sinuously curved, as shown, and their front arms are arranged in angular relation to their rear portions.

The hand cultivator is equipped with a pair of inclined handles 30, connected by inclined rods 31 with the upwardly bent ends 6 of the front side bars or members of the frame, and supported by a central inclined brace 32 and a pair of rear inclined braces 33. The inclined rods 31 have flattened upper portions 34, which are secured to the outer faces of the handles 30, and the latter are connected by upper and lower transverse rungs 35 and 36. The central brace 32, which inclines upwardly and rearwardly in a direction longitudinally of the cultivator, is provided with a lower forked end 37, which straddles the depending arms 8 of the front bars or members of the frame, and is secured to the same by the said spaced bolt 10. The upper end of the brace 32 is provided with an eye 38, which receives the front transverse rung 36.

The rear braces 33, which are transversely inclined, are crossed, as clearly shown in Fig. 1 of the drawings, and their lower terminals 39 are bent inwardly and are connected with the frame by means of the bolts 27, which pierce the transversely disposed bars 26 and 28. The upper ends 40 of the rear braces are flattened and bent vertically, and secured to the inner faces of the handles by bolts 41, or other suitable fastening devices. The handles by being connected with the front of the frame near the front of the rim of the wheel afford the operator great power in manipulating the cultivator.

Having thus fully described my invention, what I claim as new and desire to secure by Letters Patent, is:—

1. A hand cultivator including a frame extending from the front to the back of the cultivator, a wheel supporting the front portion of the frame, adjustable side members pivotally connected at their front portions with the frame, levers mounted on the frame at the rear portion thereof and connected with the adjustable side members, and cultivating devices carried by the side members.

2. A hand cultivator including a frame extending from the front to the back of the cultivator, a wheel supporting the front portion of the frame, adjustable side members pivotally connected at their front portions with the frame, levers located at the rear portion of the frame and connected with the adjustable side members, threaded fastening devices mounted on the frame and pivoting the levers, and clamping nuts arranged on the fastening devices and engaging the levers for securing the side members in their adjustment.

3. A hand cultivator including a frame extending from the front to the back of the cultivator, a wheel supporting the front of the frame, adjustable side members pivotally connected at their front ends with the frame and provided at their rear portions with transversely disposed arms slidably connected with the frame, adjusting levers mounted on the rear portion of the frame, and links connecting the levers with the adjustable members.

4. A hand cultivator including a frame having spaced front bars and provided with a central rear bar, a wheel mounted between the spaced front bars, adjustable side bars pivotally connected at their front ends with the frame in rear of the wheel and provided at their rear portions with inwardly extending transverse arms slidably connected with the rear bar of the frame, adjusting levers pivotally mounted at the rear portion of the frame and connected with the adjustable side bars, and cultivating devices mounted on the rear bar of the frame and on the adjustable side bars.

5. A hand cultivator including a frame, a wheel supporting the front of the frame, approximately horizontal side bars arranged at the rear portion of the frame, front and rear cultivating devices mounted on the side bars and on the frame, the rear cultivating devices being of greater length than and extending below the front cultivating devices, and inclined handles connected with the frame.

6. A hand cultivator including a frame having spaced front bars and provided with a central rear bar, side bars pivotally connected with the frame and located at opposite sides of the central bars, a transverse bar mounted on the frame at the rear end of the central bar thereof, an arched bar secured to the transverse bar, bolts extending upward from the arched bar, operating levers pivoted to the arched bar by the said bolts and connected with the adjustable side bars, and clamping nuts mounted on the bolts and engaging the levers to secure the side bars in their adjustment.

7. A hand cultivator including a frame composed of spaced front bars having inwardly bent rear portions and provided with depending rear arms, said front bars being constructed of channeled metal, a central rear bar provided with an upwardly extending front arm secured in the channels of the depending arms of the front bars, a wheel mounted between the front bars, side bars pivotally connected to the frame and located at opposite sides of the central bar, cultivating devices carried by the side bars, and means for adjusting the latter.

8. A hand cultivator including a frame having spaced front bars and provided with a central rear bar, upper and lower plates secured to the rear bar and extending from the opposite sides thereof, side bars pivoted at their front ends between the said plates, adjusting devices mounted on the frame at the rear portion thereof and connected with the side bars, and cultivating devices carried by the side bars.

9. A hand cultivator including a frame, a wheel supporting the front of the frame, cultivating devices located at the rear portion of the frame, inclined handles connected with the front portion of the frame, transversely disposed rear plates arranged at an inclination and crossing each other and supporting the handles, and a central longitudinally inclined rear brace connected with the handles.

10. A hand cultivator including a frame having spaced front bars and provided with a central rear bar, said frame having an intermediate vertical portion, a wheel mounted between the front bars and connected with the same at points intermediate of the ends thereof, inclined handles provided with rods extending to the front terminals of the front side bars of the frame, a central longitudinally inclined brace having a forked lower end straddling the intermediate upright portion of the frame, and crossed transversely inclined braces connected with the rear portion of the frame and supporting the handles.

11. A hand cultivator including a frame composed of spaced front bars, a central rear bar, and an upright portion connecting the said front and rear bars, a wheel mounted between the front bars, cultivating devices located at the rear portion of the frame and connected with the same, inclined handles connected with the front terminals of the front bars of the frame, transversely inclined rear braces connected with the rear portion of the frame and supporting the handles, and a central brace connected with the handles and with the upright portion of the frame.

In testimony, that I claim the foregoing as my own, I have hereto affixed my signature in the presence of two witnesses.

JOHN T. ANDERSON.

Witnesses:
FRANCES HEATHERMAN,
JOHN W. CROWL.